US012644638B2

(12) United States Patent
Cho et al.

(10) Patent No.: US 12,644,638 B2
(45) Date of Patent: Jun. 2, 2026

(54) REFRIGERATOR

(71) Applicant: Samsung Electronics Co., Ltd.,
Suwon-si (KR)

(72) Inventors: Changhun Cho, Suwon-si (KR);
Donghwa Kim, Suwon-si (KR);
Hyoseok Noh, Suwon-si (KR);
Sungcheul Park, Suwon-si (KR);
Changhak Lim, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 157 days.

(21) Appl. No.: 18/590,733

(22) Filed: Feb. 28, 2024

(65) Prior Publication Data

US 2024/0200858 A1 Jun. 20, 2024

Related U.S. Application Data

(63) Continuation of application No.
PCT/KR2022/012164, filed on Aug. 16, 2022.

(30) Foreign Application Priority Data

Sep. 10, 2021 (KR) ........................ 10-2021-0121294

(51) Int. Cl.
F25D 23/06 (2006.01)
F25D 21/14 (2006.01)
B29C 45/00 (2006.01)

(52) U.S. Cl.
CPC ............. F25D 21/14 (2013.01); F25D 23/06
(2013.01); F25D 23/065 (2013.01);
(Continued)

(58) Field of Classification Search
CPC ...... F25D 21/14; F25D 23/065; F25D 23/066;
F25D 23/06; F25D 2323/06
See application file for complete search history.

(56) References Cited

U.S. PATENT DOCUMENTS 5,499,514 A * 3/1996 Ho .......................... F25D 21/14
62/410
6,460,955 B1 10/2002 Vaughan et al.
(Continued)

FOREIGN PATENT DOCUMENTS

CN 001560545 A 1/2005
CN 206362072 U 7/2017
(Continued)

OTHER PUBLICATIONS

International Search Report and Written Opinion of the International Searching Authority dated Dec. 2, 2022, in connection with International Application No. PCT/KR2022/012164, 9 pages.

*Primary Examiner* — Kimberley S Wright

(57) ABSTRACT

Disclosed is a refrigerator capable of minimizing generation of undercuts when manufacturing components of an inner case by injection molding. The refrigerator includes an inner case forming a storage compartment, and comprising a plurality of plates formed by injection molding; an outer case coupled to an outside of the inner case to form an external appearance; and an insulation disposed between the inner case and the outer case. A rear plate corresponding to one of the plates comprises: a drain hole formed through the rear plate to discharge water inside the inner case to the outside of the inner case; an inclined surface inclined downward toward the drain hole to allow water inside the inner case to flow to the drain hole; and an undercut prevention surface disposed below and spaced apart from the inclined surface, and forming a portion of an outer surface of the rear plate.

17 Claims, 12 Drawing Sheets

(52) U.S. Cl.
 CPC ............ *F25D 23/066* (2013.01); *B29C 45/00* (2013.01); *F25D 2323/06* (2013.01)

(56) References Cited

U.S. PATENT DOCUMENTS

| | | | |
|---|---|---|---|
| 2011/0011106 A1 * | 1/2011 | Ahn et al. | |
| 2016/0258671 A1 * | 9/2016 | Allard ................... | F25D 23/085 |
| 2017/0097186 A1 * | 4/2017 | Park ...................... | F25D 23/069 |
| 2017/0284724 A1 * | 10/2017 | Lee .......................... | F25B 5/02 |
| 2018/0187957 A1 * | 7/2018 | Jung .................... | F25D 23/062 |
| 2020/0408352 A1 | 12/2020 | Ryu et al. | |
| 2022/0341656 A1 | 10/2022 | Betz et al. | |
| 2023/0358463 A1 | 11/2023 | Kim et al. | |

FOREIGN PATENT DOCUMENTS

| | | | | |
|---|---|---|---|---|
| EP | 3203168 A1 * | 8/2017 | ............ | F25D 21/14 |
| EP | 2618084 B1 | 8/2019 | | |
| JP | H11-132645 A | 5/1999 | | |
| JP | 2007-008113 A | 1/2007 | | |
| JP | 5679955 B2 | 3/2015 | | |
| KR | 20-1999-0012961 U | 4/1999 | | |
| KR | 10-2001-0023799 A | 3/2001 | | |
| KR | 10-2004-0001386 A | 1/2004 | | |
| KR | 10-0724445 B1 | 6/2007 | | |
| KR | 10-2007-0107447 A | 11/2007 | | |
| KR | 20-2008-0005926 U | 12/2008 | | |
| KR | 10-2015-0124111 A | 11/2015 | | |
| KR | 10-2020-0015846 A | 2/2020 | | |
| KR | 10-2020-0015847 A | 2/2020 | | |
| WO | 2020070770 A1 | 4/2020 | | |
| WO | 2021043575 A1 | 3/2021 | | |

* cited by examiner

REFRIGERATOR

CROSS-REFERENCE TO RELATED APPLICATIONS

This application is a Bypass Continuation of International Application No. PCT/KR2022/012164, filed Aug. 16, 2022, which claims priority to Korean Patent Application No. 10-2021-0121294, filed Sep. 10, 2021, the disclosures of which are herein incorporated by reference in their entirety.

BACKGROUND

1. Field

The present disclosure relates to a refrigerator including a prefabricated inner case.

2. Description of Related Art

A refrigerator is a device that is composed of a main body including a storage compartment, and a cold air supply system configured to supply cold air to the storage compartment so as to keep food fresh. The storage compartment includes a refrigerating compartment maintained at approximately 0 to 5° C. to store food in a refrigerated manner, and a freezing compartment maintained at approximately 0 to −30° C. to store food in a frozen manner.

An inner case and an outer case are coupled to each other to form the main body of the refrigerator. The inner case forms the storage compartment, and the outer case forms the exterior of the refrigerator. An insulation for thermal insulation is arranged between the inner case and the outer case. The storage compartment of the refrigerator is provided with an open front side, and the open front side is closed to maintain a temperature of the storage compartment.

Generally, the inner case of the refrigerator is manufactured in a vacuum forming process such that a sheet of resin material is heated and the stretched sheet is put on a mold, and air is suctioned against the mold, and the heated sheet covers the mold or suctioned into the inside of the mold by the suction force.

The inner case formed in the vacuum forming process is not uniform in thickness and has variations. Due to the thickness deviation of the inner case, the quality of the appearance inside the storage compartment may be reduced.

SUMMARY

The present disclosure is directed to providing a refrigerator capable of, when loading and storing an inner case, storing a large number of inner cases in the same space and capable of transporting the large number of inner cases at a time by reducing a volume of the inner case by allowing the inner case to be disassembled.

Further, the present disclosure is directed to providing a refrigerator including an inner case formed by assembling components formed by injection molding.

Further, the present disclosure is directed to providing a refrigerator capable of minimizing generation of undercuts when manufacturing components of an inner case by injection molding.

Further, the present disclosure is directed to providing a refrigerator with improved productivity by high-speed and thin-film injection molding of components of an inner case.

One aspect of the present disclosure provides a refrigerator including an inner case forming a storage compartment, and including a plurality of plates formed by injection molding, an outer case coupled to an outside of the inner case to form an external appearance, and an insulation disposed between the inner case and the outer case. A rear plate corresponding to one of the plurality of plates includes a drain hole formed through the rear plate to discharge water inside the inner case to the outside of the inner case, an inclined surface inclined downward toward the drain hole to allow water inside the inner case to flow to the drain hole, and an undercut prevention surface disposed below the inclined surface and spaced apart from the inclined surface, and forming a portion of an outer surface of the rear plate.

The undercut prevention surface may be flat from a front side to a rear side or inclined upward from the front side to the rear side.

The undercut prevention surface may be provided with substantially the same thickness as the inclined surface.

The undercut prevention surface may extend from one end of the inclined surface.

The undercut prevention surface may include a first portion inclined downward in a left and right direction, and a second portion connected to the first portion and inclined upward in the left and right direction.

The inclined surface may include a first inclined surface inclined downward from a front side to a rear side and disposed in front of the drain hole, and a second inclined surface inclined upward from the front side to the rear side and disposed behind the drain hole.

The undercut prevention surface may be disposed below the first inclined surface.

The second inclined surface may include a depression formed by recessing a region of the second inclined surface adjacent to the drain hole.

The depression may include a recessed surface having an inclination angle greater than an inclination angle of the second inclined surface.

A separation space may be formed between the inclined surface and the undercut prevention surface.

The rear plate may further include a connecting rib provided to connect the inclined surface and the undercut prevention surface in the separation space.

The connecting rib may include a plurality of connecting ribs.

The plurality of connecting ribs may be arranged to be spaced apart from each other in a left and right direction within the separation space.

The rear plate may further include a guide rib formed along a circumference of the drain hole and extending downward from the circumference of the drain hole.

The guide rib may extend from one side of the drain hole to another side of the drain hole through a front side of the drain hole.

The upper plate, the lower plate, the left plate, the right plate, and the rear plate that form the inner case may be formed by injection molding.

Another aspect of the present disclosure provides a refrigerator including an inner case forming a refrigerating compartment, and including a plurality of plates formed by injection molding, an outer case disposed outside the inner case to form an external appearance, and an insulation disposed between the inner case and the outer case. A rear plate corresponding to one of the plurality of plates includes a drain hole formed through the rear plate to discharge water of the rear plate to an outside of the rear plate, an inclined surface inclined downward toward the drain hole to allow water inside the rear plate to flow to the drain hole and including a front inclined surface disposed in front of the drain hole, a rear inclined surface disposed behind the drain hole, and an undercut prevention surface provided to extend from one end of the front inclined surface and spaced apart from the front inclined surface and forming a portion of an outer surface of the rear plate.

The undercut prevention surface may be flat from a rear end of the front inclined surface to a front side or inclined downward from the rear end of the front inclined surface to the front side.

The undercut prevention surface may include a first portion inclined downward in a left and right direction, and a second portion connected to the first portion and inclined upward in the left and right direction.

The rear inclined surface may include a depression formed by recessing a region of the rear inclined surface adjacent to the drain hole.

The rear plate may further include a connecting rib provided to connect the front inclined surface and the undercut prevention surface in a separation space formed between the front inclined surface and the undercut prevention surface.

The rear plate may further include a guide rib formed along a circumference of the drain hole and extending downward from the circumference of the drain hole.

By reducing a volume of an inner case by allowing the inner case to be disassembled, a refrigerator may store a large number of inner cases in the same space when loading and storing the inner case, and may transport the large number of inner cases at a time.

Further, a refrigerator may include an inner case formed by assembling components formed by injection molding.

Further, a refrigerator may minimize generation of undercuts when manufacturing components of an inner case by injection molding.

Further, a refrigerator may have improved productivity by high-speed and thin-film injection molding of components of an inner case.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
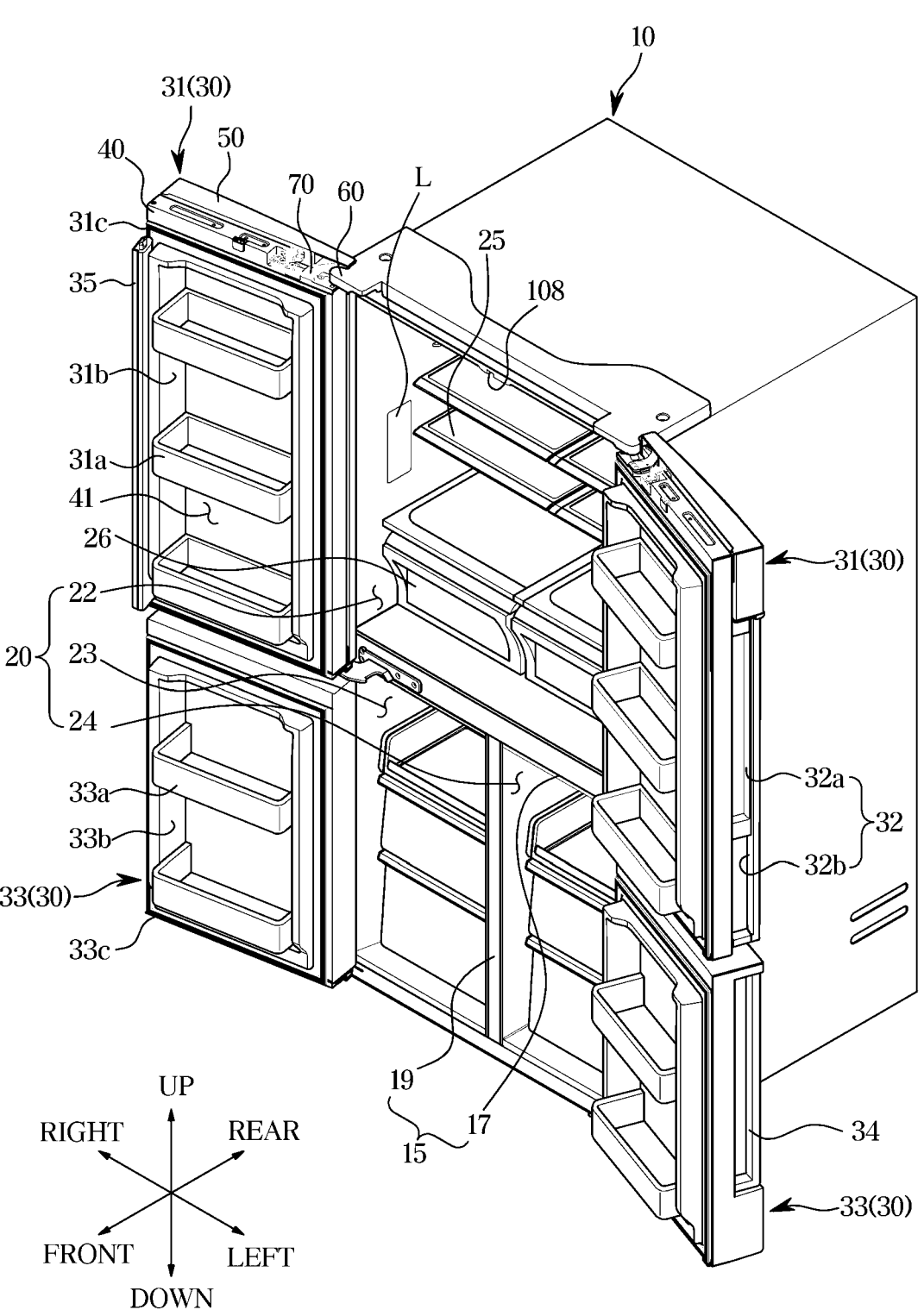
FIG. 1 is a perspective view of a refrigerator according to one embodiment of the disclosure, illustrating a state in which a door is opened.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left", "right" and the like may be defined by the drawings, but the shape and the location of the component is not limited by the term.

The disclosure will be described more fully hereinafter with reference to the accompanying drawings.

Figure 2:
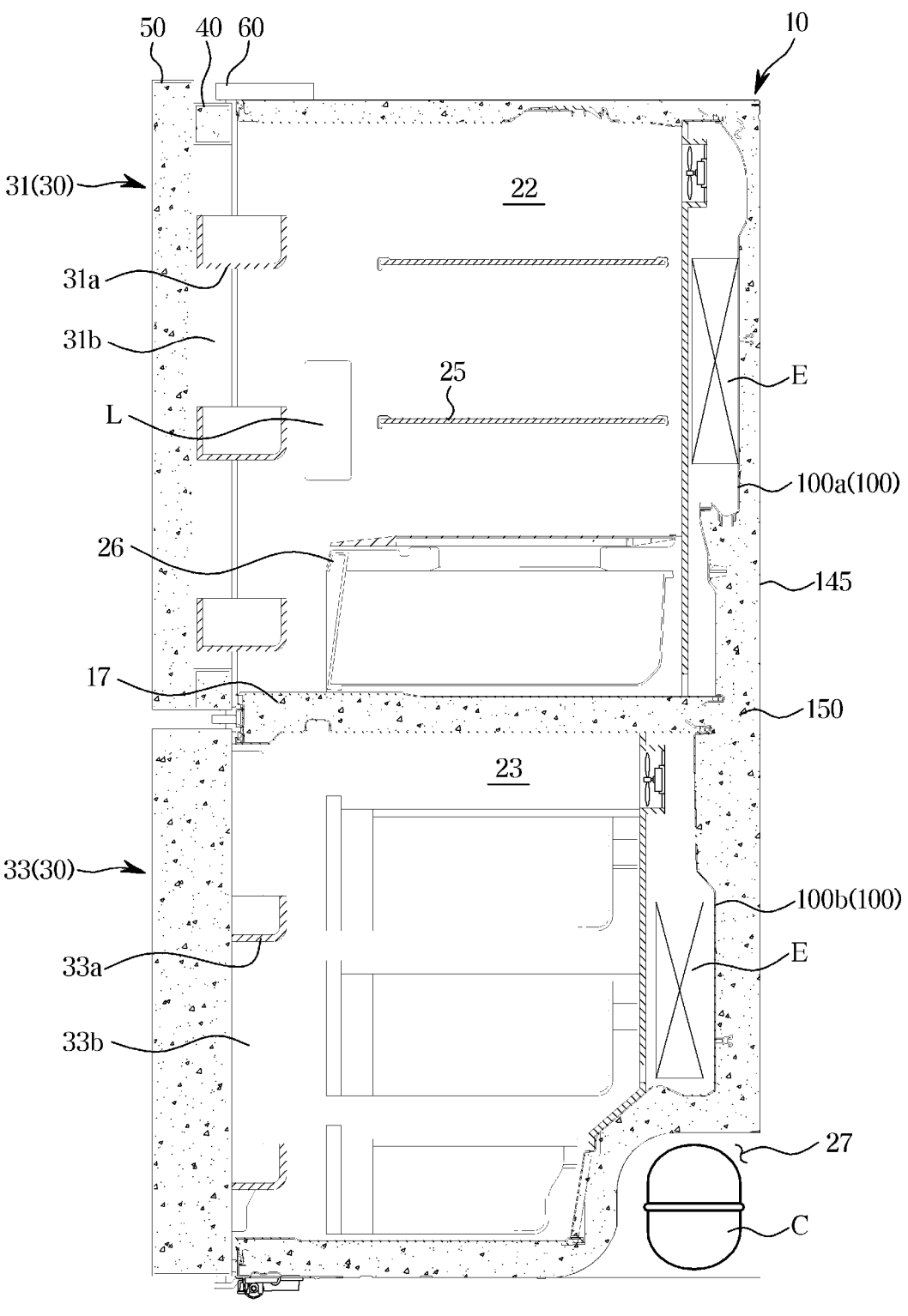
FIG. 2 is a schematic side cross-sectional view of the refrigerator according to one embodiment of the disclosure.

FIG. 1 is a perspective view of a refrigerator according to one embodiment of the disclosure, illustrating a state in which a door is opened. FIG. 2 is a schematic side cross-sectional view of the refrigerator according to one embodiment of the disclosure.

In the description, up, down, left, right, front and rear are defined based on a direction illustrated in FIG. 1.

As illustrated in FIGS. 1 and 2, a refrigerator may include a main body 10, a storage compartment 20 vertically partitioned inside the main body 10, a door 30 configured to open and close the storage compartment 20, and a cold air supply device (not shown) configured to supply cold air to the storage compartment 20.

The main body 10 may include an inner case 100 forming the storage compartment 20, an outer case 145 coupled to an outside of the inner case 100 to form an external appearance, and an insulation 150 foamed between the inner case 100 and the outer case 145 to thermally insulate the storage compartment 20.

A machine room 27, in which a compressor C configured to compress a refrigerant and a condenser (not shown) configured to condense the refrigerant compressed by the compressor C are installed, may be provided at a rear lower portion of the main body 10.

The cold air supply device may include the compressor C configured to compress the refrigerant, the condenser (not shown) configured to condense the refrigerant, an expansion valve (not shown) configured to expand the refrigerant, and an evaporator E configured to evaporate the refrigerant.

The storage compartment 20 may be divided into a plurality of spaces by a partition 15, and a plurality of shelves 25 and storage containers 26 may be provided in the storage compartment 20 to store food and the like.

The storage compartment 20 may be divided into a plurality of storage compartments 22, 23, and 24 by the partition 15, and the partition 15 may include a first partition 17 horizontally coupled to the inside of the storage compartment 20 to divide the storage compartment 20 into an upper storage compartment 22 and lower storage compartments 23 and 24, and a second partition 19 vertically coupled to the inside of the lower storage compartments 23 and 24 to divide the lower storage compartments 23 and 24 into a first storage compartment 23 and a second storage compartment 24.

The partition 15 including a T-shape formed by the first partition 17 and the second partition 19 coupled to each other may divide the storage compartment 20 into three spaces. Among the upper storage compartment 22 and the lower storage compartments 23 and 24 divided by the first partition 17, the upper storage compartment 22 may be used as a refrigerating compartment, and the lower storage compartments 23 and 24 may be used as freezing compartments.

All the lower storage compartments 23 and 24 may be used as freezing compartments. Alternatively, the first storage compartment 23 may be used as a freezing compartment and the second storage compartment 24 may be used as a refrigerating compartment. Alternatively, the first storage compartment 23 may be used as a freezing compartment, and the second storage compartment 24 may be used as a freezing compartment and a refrigerating compartment.

The division of the storage compartment 20 as described above is an example, and each storage compartment 22, 23, and 24 may be used differently from the above configuration.

The refrigerating compartment 22 and the freezing compartments 23 and 24 may be opened and closed by the door 30 rotatably coupled to the main body 10, respectively.

The door 30 may include a pair of refrigerating compartment doors 31 rotatably coupled to the main body 10 to open and close the refrigerating compartment 22, and a pair of freezing compartment doors 33 rotatably coupled to the main body 10 to open and close the freezing compartments 23 and 24.

The pair of refrigerating compartment doors 31 may be respectively opened and closed through a pair of refrigerating compartment door handles 32 including a first door handle 32a or a second door handle 32b. The refrigerating compartment 22 may be opened and closed by the pair of refrigerating compartment doors 31, and a rotating rod 35 may be installed on at least one of the pair of refrigerating compartment doors 31 so as to seal between the pair of refrigerating compartment doors 31 without a gap therebetween which may occur in response to closing the refrigerating compartment doors 31. The rotating rod 35 may be rotatably coupled to at least one of the pair of refrigerating compartment doors 31. The rotating rod 35 may be guided by a rotation guide 108 formed on the inner case 100, so as to rotate according to the opening and closing of the refrigerating compartment door 31.

The pair of freezing compartment doors 33 may be respectively opened and closed by a freezing compartment door handle 34. A sliding door may be applied to the door configured to open and close the freezing compartments 23 and 24.

Door shelves 31a and 33a in which food is stored may be provided on rear surfaces of the pair of refrigerating compartment doors 31 and the pair of freezing compartment doors 33, respectively.

The door shelves 31a and 33a may respectively include shelf supports 31b and 33b extending vertically from the doors 31 and 33 to support the door shelves 31a and 33a on left and right sides of the door shelves 31a and 33a. The shelf supports 31b and 33b may extend from the doors 31 and 33, respectively. The shelf supports 31b and 33b may be detachably provided on the doors 31 and 33, respectively, as a separate configuration.

In addition, first gaskets 31c and 33c may be respectively provided on the rear edge of the doors 31 and 33 to seal a gap with the main body 10 in response to closing of the doors 31 and 33. The first gaskets 31c and 33c may be installed in a loop shape along the edges on the rear surface of each of the doors 31 and 33, and a magnet may be included in the first gaskets 31c and 33c.

The pair of refrigerating compartment doors 31 configured to open and close the refrigerating compartment 22 may be arranged on a left side and a right side. Hereinafter for convenience of description, only the refrigerating compartment door 31 arranged on the left side of the drawing will be described, and the refrigerating compartment door 31 arranged on the left side of the drawing will be referred to as the refrigerating compartment door 31. However, the refrigerating compartment door 31 described below is not limited to the refrigerating compartment door 31 arranged on the left side of the drawing but may also be applied to the refrigerating compartment door 31 arranged on the right side of the drawing, and applied to at least one of the pair of freezing compartment doors 33.

The refrigerating compartment door 31 may be provided as a double door including a first door 40 and a second door 50.

The first door 40 may be rotatably connected to the main body 10 by a first hinge 60 so as to open and close the refrigerating compartment 22. The above-described door shelf 31*a*, shelf support 31*b*, and first gasket 31*c* may be provided on the first door 40.

The first door 40 may include an opening 41 that is formed to allow a user to approach the door shelf 31*a* to insert or withdraw food while the first door 40 is closed. The opening 41 may be formed through the first door 40 and may be opened and closed by the second door 50.

The second door 50 may be disposed in front of the first door 40 to open and close the opening 41 of the first door 40, and the second door 50 may be rotatable in the same direction as the first door 40. Although the drawing illustrates that the second door 50 is rotatably supported by a second hinge 70 installed on the first door 40 and is rotatable with respect to the first door 40, the disclosure is not limited thereto. The second door 50 may be rotatable with respect to the main body 10 because the second hinge 70 is installed on the main body 10.

The second door 50 may include a second gasket for maintaining airtightness with the first door 40. The second gasket may be installed in a loop shape along an edge of a rear surface of the second door 50, and a magnet may be included therein.

Figure 3:
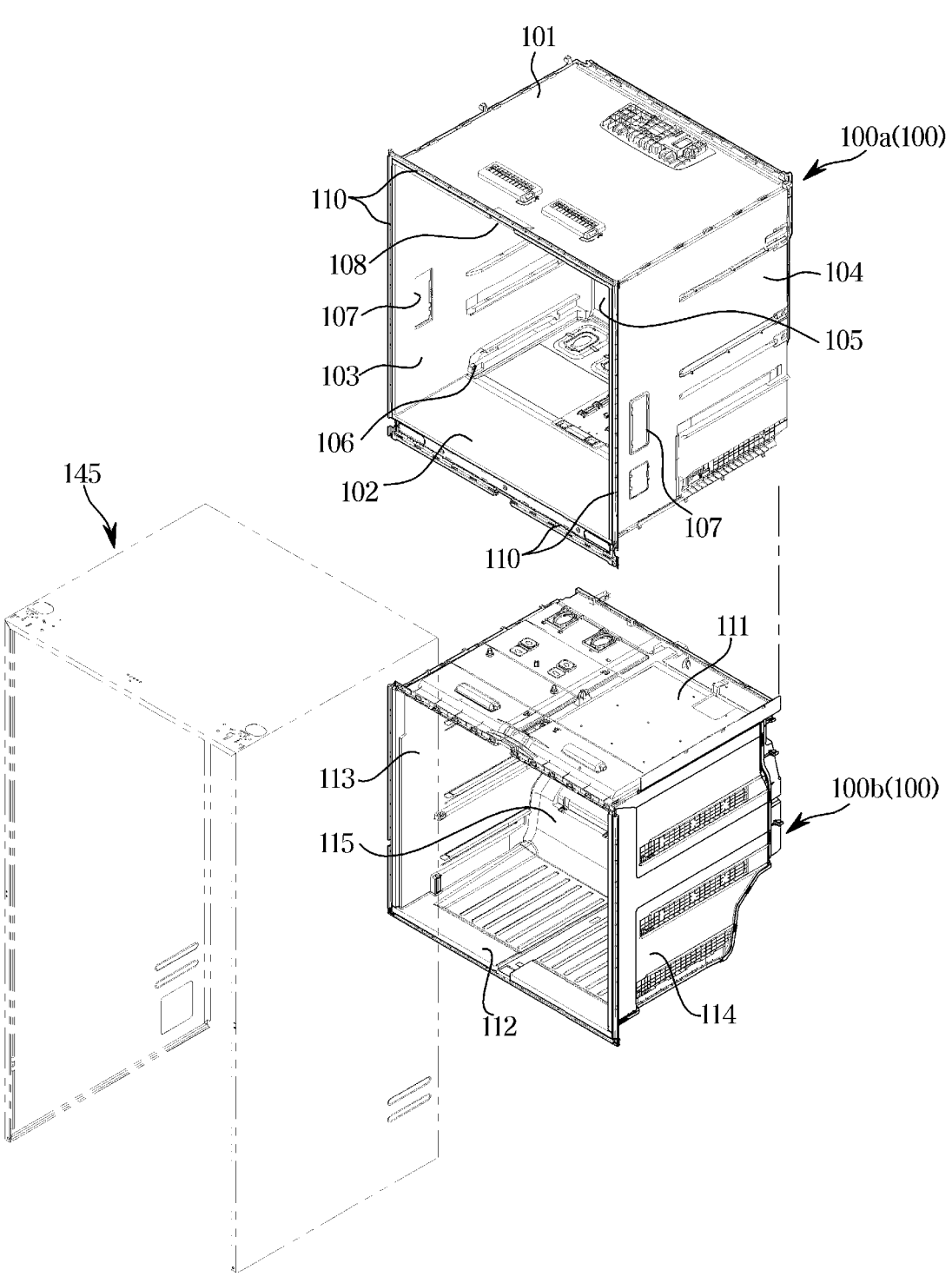
FIG. 3 is a view illustrating a state in which an inner case and an outer case are separated from each other in the refrigerator according to one embodiment of the disclosure.
Figure 4:
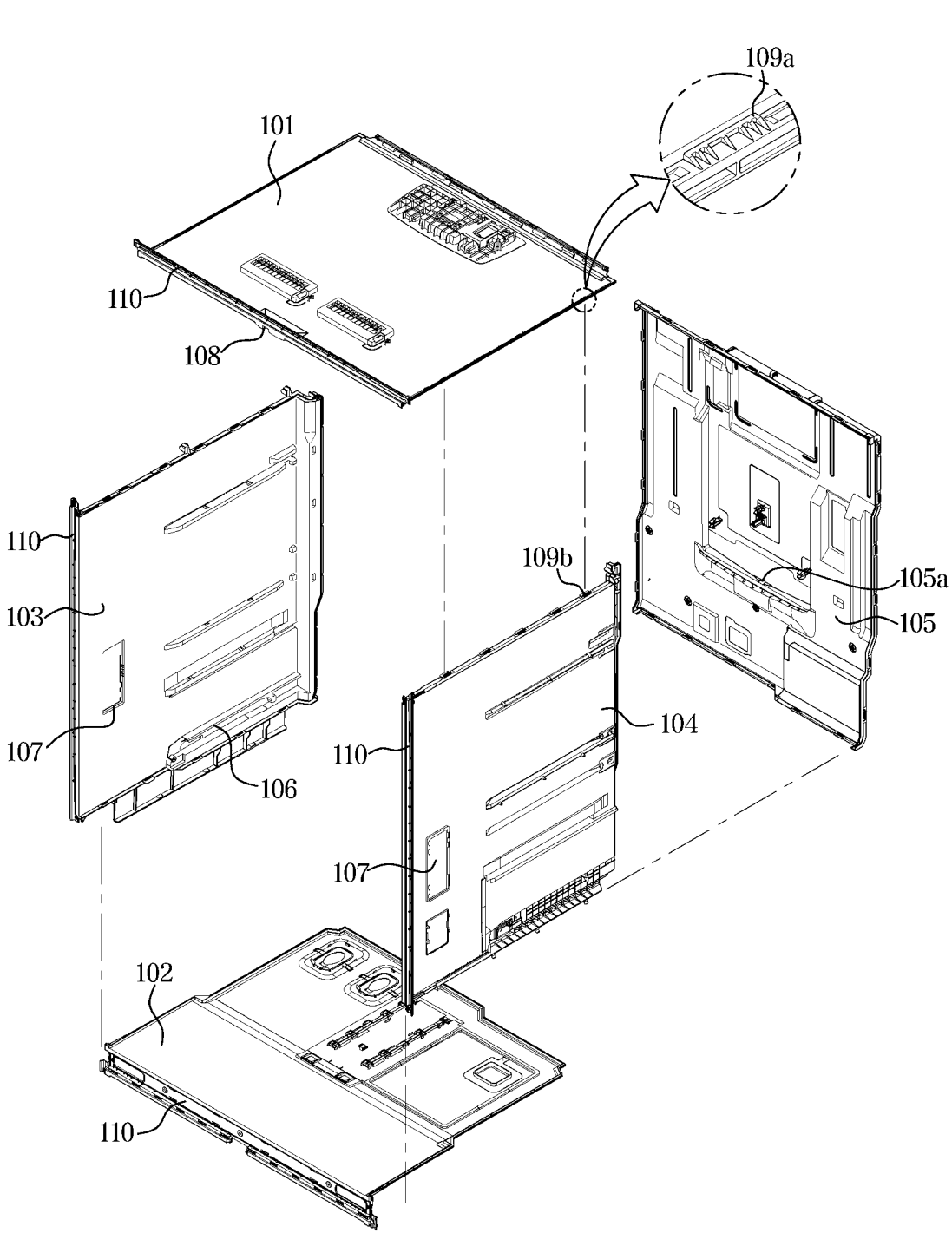
FIG. 4 is a view illustrating a state in which a first inner case is disassembled in the refrigerator according to one embodiment of the disclosure.
Figure 5:
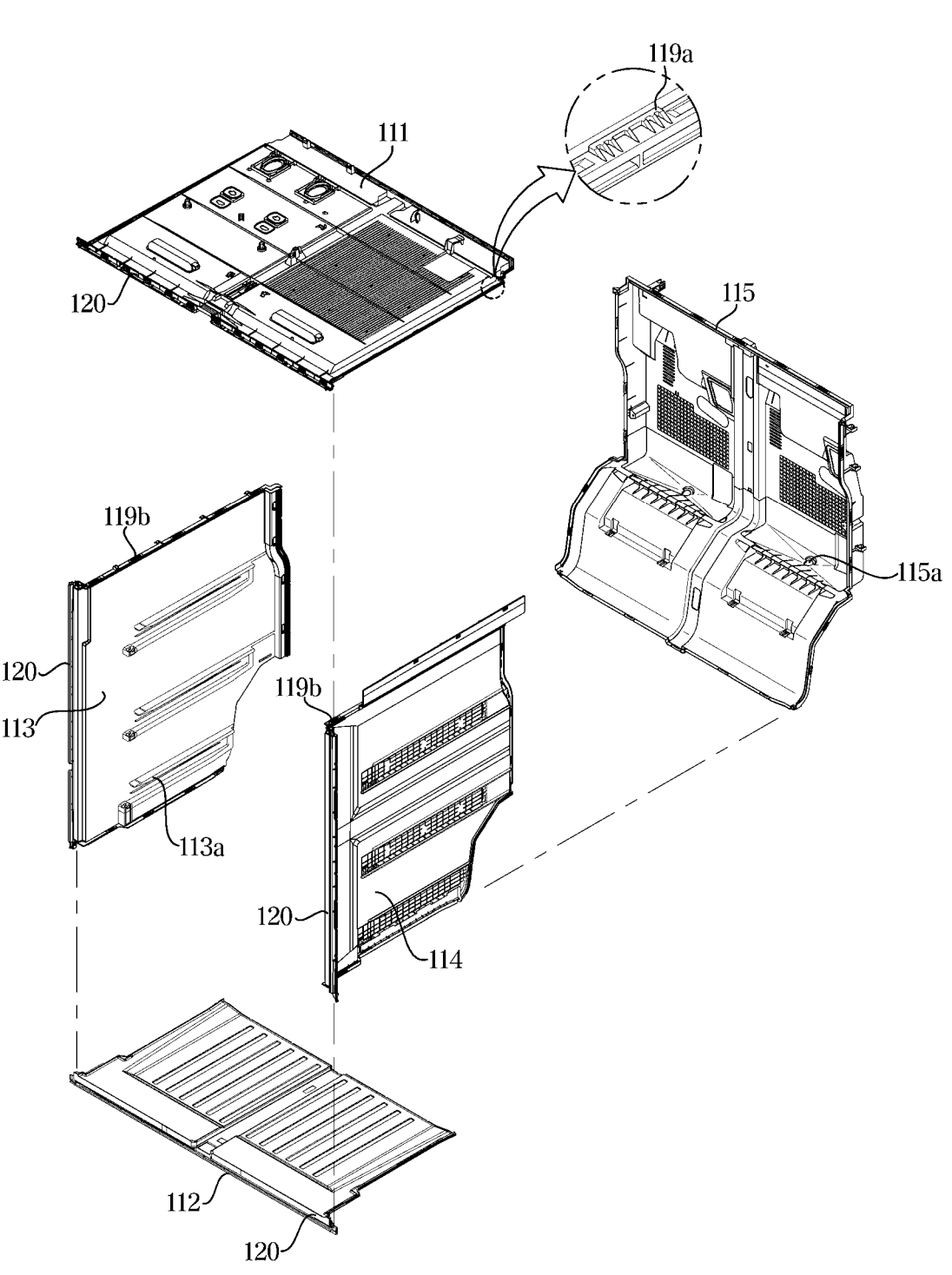
FIG. 5 is a view illustrating a state in which a second inner case is disassembled in the refrigerator according to one embodiment of the disclosure.

FIG. 3 is a view illustrating a state in which an inner case and an outer case are separated from each other in the refrigerator according to one embodiment of the disclosure. FIG. 4 is a view illustrating a state in which a first inner case is disassembled in the refrigerator according to one embodiment of the disclosure. FIG. 5 is a view illustrating a state in which a second inner case is disassembled in the refrigerator according to one embodiment of the disclosure.

Referring to FIGS. 3 to 6, the inner case 100 may include a first inner case 100*a* forming the refrigerating compartment 22 positioned above the freezing compartments 23 and 24, and a second inner case 100*b* forming the freezing compartments 23 and 24 positioned below the refrigerating compartment 22. The first inner case 100*a* and the second inner case 100*b* may be coupled by the same coupling structure in which only the shape is partially different.

Referring FIG. 4, the first inner case 100*a* according to certain embodiments may include a plurality of first plates 101, 102, 103, 104, and 105. The first inner case 100*a* may be formed by coupling the plurality of first plates 101, 102, 103, 104, and 105. The plurality of first plates 101, 102, 103, 104, and 105 may be coupled to each other without a separate fastening member. That is, each of the plurality of first plates 101, 102, 103, 104, and 105 may include a coupler integrally formed for the mutual coupling thereof.

The plurality of first plates 101, 102, 103, 104, and 105 may be formed of a resin material through an injection molding method. Each of the plurality of first plates 101, 102, 103, 104, and 105 may include four edges. The plurality of first plates 101, 102, 103, 104, and 105 may include a first upper plate 101, a first lower plate 102, a first left plate 103, a first right plate 104, and a first rear plate 105.

The first upper plate 101 may form an upper surface of the storage compartment 22. The first lower plate 102 may form a lower surface of the storage compartment 22. The first left plate 103 may form a left surface of the storage compartment 22. The first right plate 104 may form a right surface of the storage compartment 22. The first rear plate 105 may form a rear surface of the storage compartment 22.

A shape of the first upper plate 101, the first lower plate 102, the first left plate 103, the first right plate 104 and the first rear plate 105 is not limited to a flat shape without a curve. Alternatively, the first upper plate 101, the first lower plate 102, the first left plate 103, the first right plate 104 and the first rear plate 105 may include a curve. Therefore, the first upper plate 101, the first lower plate 102, the first left plate 103, the first right plate 104 and the first rear plate 105 may include various shapes as long as forming the upper surface, the lower surface, the left surface, the right surface and the rear surface of the first storage compartment 23.

In addition, at least two or more plates adjacent to each other among the first upper plate 101, the first lower plate 102, the first left plate 103, the first right plate 104, and the first rear plate 105 may be integrally formed with each other.

That is, the first inner case 100*a* may be formed of less than the five parts corresponding to the first upper plate 101, the first lower plate 102, the first left plate 103, the first right plate 104, and the first rear plate 105.

For example, the first upper plate 101 and the first right plate 104 may be integrally injection-molded, and the first lower plate 102 and the first left plate 103 may be integrally injection-molded. Alternatively, the first upper plate 101 and the first left plate 103 may be integrally injection-molded, and the first lower plate 102 and the first right plate 104 may be integrally injection-molded.

Even when the first inner case 100*a* is formed of less than the five parts corresponding to the first upper plate 101, the first lower plate 102, the first left plate 103, the first right plate 104, and the first rear plate 105, as described above, descriptions described below may be equally applied.

The first inner case 100*a* may include the first upper plate 101, the first lower plate 102, the first left plate 103, the first right plate 104, and the first rear plate 105. The first upper plate 101, the first lower plate 102, the first left plate 103, the first right plate 104, and the first rear plate 105 may be separated from each other. The first upper plate 101, the first lower plate 102, the first left plate 103, the first right plate 104, and the first rear plate 105 may be injection molded. The first upper plate 101, the first lower plate 102, the first left plate 103, the first right plate 104, and the first rear plate 105 separated from each other may be assembled to form the first inner case 100*a*. Because the first upper plate 101, the first lower plate 102, the first left plate 103, the first right plate 104, and the first rear plate 105 are injection molded, the first upper plate 101, the first lower plate 102, the first left plate 103, the first right plate 104, and the first rear plate 105 may be molded to have various patterns without an additional post-process. Further, the first upper plate 101, the first lower plate 102, the first left plate 103, the first right plate 104, and the first rear plate 105 may be molded to have various colors. That is, the first upper plate 101, the first lower plate 102, the first left plate 103, the first right plate 104, and the first rear plate 105 may have a different pattern or a different color for each purpose of the storage compartment 20. In addition, the first upper plate 101, the first lower plate 102, the first left plate 103, the first right plate 104, and the first rear plate 105 may all have different patterns or different colors. Accordingly, for the user choice in the refrigerator, it is possible to widen a range of selection.

A front flange 110 may be integrally formed on the first upper plate 101, the first lower plate 102, the first left plate 103, and the first right plate 104, respectively. Because the first upper plate 101, the first lower plate 102, the first left plate 103, and the first right plate 104 are injection-molded, the front flange 110 covering the front surface of the first inner case 100*a* may be integrally formed with the first upper plate 101, the first lower plate 102, the first left plate 103, and the first right plate 104.

The rotation guide 108 provided to guide the rotating rod 35, which is rotatably coupled to the pair of refrigerating compartment doors 31, to rotate according to the rotation of the refrigerating compartment door 31 may be injection-molded integrally with a lower surface of the first upper plate 101. A lamp case 107 in which a light emitting diode L (refer to FIG. 1) may be injection-molded integrally with the first left plate 103 and the first right plate 104.

The first left plate 103 and the first right plate 104 may be injection-molded integrally with a rail 106 in which the storage container 26 is supported to slidably move.

The first rear plate 105 is injection molded into a thin film to have competitiveness in material cost, and for this, a plurality of gates may be required. The first rear plate 105 may include a drain hole 105a provided to drain condensed water or defrost water falling from the evaporator E.

A plurality of assembly hooks 109a or a plurality of assembly holes 109b for assembly may be formed on the first upper plate 101, the first lower plate 102, the first left plate 103, the first right plate 104, and the first plate 105. The first upper plate 101, the first lower plate 102, the first left plate 103, and the first right plate 104 may be assembled to each other through the remaining three edge surfaces, excluding the front surface, of the four edge surfaces. Accordingly, the plurality of assembly hooks 109a or the plurality of assembly holes 109b may be formed on the remaining three edge surfaces excluding the front flange 110. Further, the plurality of assembly hooks 109a or the plurality of assembly holes 109b may be formed on all the four edge surfaces of the first rear plate 105. That is, when the assembly of the first upper plate 101 and the first right plate 104 is described as an example, the plurality of assembly hooks 109a may be formed on a right surface of the first upper plate 101, and the plurality of assembly holes 109b may be formed on an upper surface of the first right plate 104 assembled to the right surface of the first upper plate 101. Although it is shown in the drawing that the plurality of assembly hooks 109a is formed on the right surface of the first upper plate 101 and the plurality of assembly holes 109b is formed on the upper surface of the first right plate 104, the plurality of assembly holes 109b may be formed on the right surface of the first upper plate 101, and the plurality of assembly hooks 109a may formed on the upper surface of the first right plate 104. As for the first lower plate 102, the plurality of assembly hooks 109a may be formed on the lower side of the three edge surfaces, and thus the plurality of assembly hooks 109a may not be shown in the drawing.

Referring FIG. 5, the second inner case 100b according to certain embodiments may include a plurality of second plates 111, 112, 113, 114, and 115. The second inner case 100b may be formed by coupling the plurality of second plates 111, 112, 113, 114, and 115. The plurality of second plates 111, 112, 113, 114, and 115 may be coupled to each other without a separate fastening member. That is, each of the plurality of second plates 111, 112, 113, 114, and 115 may include a coupler integrally formed for the mutual coupling thereof.

The plurality of second plates 111, 112, 113, 114, and 115 may be formed of a resin material through an injection molding method. Each of the plurality of second plates 111, 112, 113, 114, and 115 may include four edges. The plurality of second plates 111, 112, 113, 114, and 115 may include a second upper plate 111, a second lower plate 112, a second left plate 113, a second right plate 114, and a second rear plate 115.

The second upper plate 111 may form an upper surface of the storage compartment 23 and 24. The second lower plate 112 may form a lower surface of the storage compartment 23 and 24. The second left plate 113 may form a left surface of the storage compartment 23 and 24. The second right plate 114 may form a right surface of the storage compartment 23 and 24. The second rear plate 115 may form a rear surface of the storage compartment 23 and 24.

A shape of the second upper plate 111, the second lower plate 112, the second left plate 113, the second right plate 114 and the second rear plate 115 is not limited to a flat shape without a curve. Alternatively, the second upper plate 111, the second lower plate 112, the second left plate 113, the second right plate 114 and the second rear plate 115 may include a curve. Therefore, the second upper plate 111, the second lower plate 112, the second left plate 113, the second right plate 114 and the second rear plate 115 may include various shapes as long as forming the upper surface, the lower surface, the left surface, the right surface and the rear surface of the storage compartments 23 and 24.

In addition, at least two or more plates adjacent to each other among the second upper plate 111, the second lower plate 112, the second left plate 113, the second right plate 114 and the second rear plate 115 may be integrally formed with each other.

That is, the second inner case 100b may be formed of less than the five parts corresponding to the second upper plate 111, the second lower plate 112, the second left plate 113, the second right plate 114 and the second rear plate 115.

For example, the second upper plate 111 and the second right plate 114 may be integrally injection-molded, and the second lower plate 112 and the second left plate 113 may be integrally injection-molded. Alternatively, the second upper plate 111 and the second left plate 113 may be integrally injection-molded, and the second lower plate 112 and the second right plate 114 may be integrally injection-molded.

Even when the second inner case 100b is formed of less than the five parts corresponding to the second upper plate 111, the second lower plate 112, the second left plate 113, the second right plate 114 and the second rear plate 115, as described above, descriptions described below may be equally applied.

The second inner case 100b may include the second upper plate 111, the second lower plate 112, the second left plate 113, the second right plate 114 and the second rear plate 115, in the same manner as the first inner case 100a. The second upper plate 111, the second lower plate 112, the second left plate 113, the second right plate 114 and the second rear plate 115 may be separated from each other. The second upper plate 111, the second lower plate 112, the second left plate 113, the second right plate 114 and the second rear plate 115 may be injection molded. The second upper plate 111, the second lower plate 112, the second left plate 113, the second right plate 114 and the second rear plate 115 separated from each other may be assembled to form the second inner case 100b. Because the second upper plate 111, the second lower plate 112, the second left plate 113, the second right plate 114 and the second rear plate 115 are injection molded, the second upper plate 111, the second lower plate 112, the second left plate 113, the second right plate 114 and the second rear plate 115 may be molded to have various patterns (not shown) without an additional post-process. Further, the second upper plate 111, the second lower plate 112, the second left plate 113, the second right plate 114 and the second rear plate 115 may be molded to have various colors. That is, the second upper plate 111, the second lower plate 112, the second left plate 113, the second right plate 114 and the second rear plate 115 may have a different pattern or a different color for each purpose of the storage compartment 20. In addition, the second upper plate 111, the second lower plate 112, the second left plate 113, the second right plate 114 and the second rear plate 115 may all have different patterns or different colors. Accordingly, for the user choice in the refrigerator, it is possible to widen a range of selection.

A front flange 120 may be integrally formed on the second upper plate 111, the second lower plate 112, the second left plate 113, and the second right plate 114. Because the second upper plate 111, the second lower plate 112, the second left plate 113, and the second right plate 114 are injection-molded, the front flange 120 covering the front surface of the second inner case 110b may be integrally formed with the second upper plate 111, the second lower plate 112, the second left plate 113, and the second right plate 114.

The second left plate 113 and the second right plate 114 may be injection-molded integrally with a rail 113a in which the storage container is supported to slidably move.

The second rear plate 115 is injection molded into a thin film to have competitiveness in material cost, and for this, a plurality of gates may be required. The second rear plate 115 may include a drain hole 115a provided to drain condensed water or defrost water falling from the evaporator E.

According to certain embodiments, a plurality of assembly hooks 119a or a plurality of assembly holes 119b for assembly may be formed on the second upper plate 111, the second lower plate 112, the second left plate 113, the second right plate 114 and the second rear plate 115. The second upper plate 111, the second lower plate 112, the second left plate 113, and the second right plate 114 may be assembled to each other through the remaining three edge surfaces, excluding the front surface, of the four edge surfaces. Accordingly, the plurality of assembly hooks 119a or the plurality of assembly holes 119b may be formed on the remaining three edge surfaces excluding the front flange 120. Further, the plurality of assembly hooks 119a or the plurality of assembly holes 119b may be formed on all the four edge surfaces of the second rear plate 115. That is, when the assembly of the second upper plate 111 and the second right plate 114 is described as an example, the plurality of assembly hooks 119a may be formed on a right surface of the second upper plate 111, and the plurality of assembly holes 119b may be formed on an upper surface of the second right plate 114 assembled to the right surface of the second upper plate 111. Although it is shown in the drawing that the plurality of assembly hooks 119a is formed on the right surface of the second upper plate 111 and the plurality of assembly holes 119b is formed on the upper surface of the second right plate 114, the plurality of assembly holes 119b may be formed on the right surface of the second upper plate 111, and the plurality of assembly hooks 119a may formed on the upper surface of the second right plate 114. As for the second lower plate 112, the plurality of assembly hooks 119a may be formed on the three edge surfaces.

Figure 6:
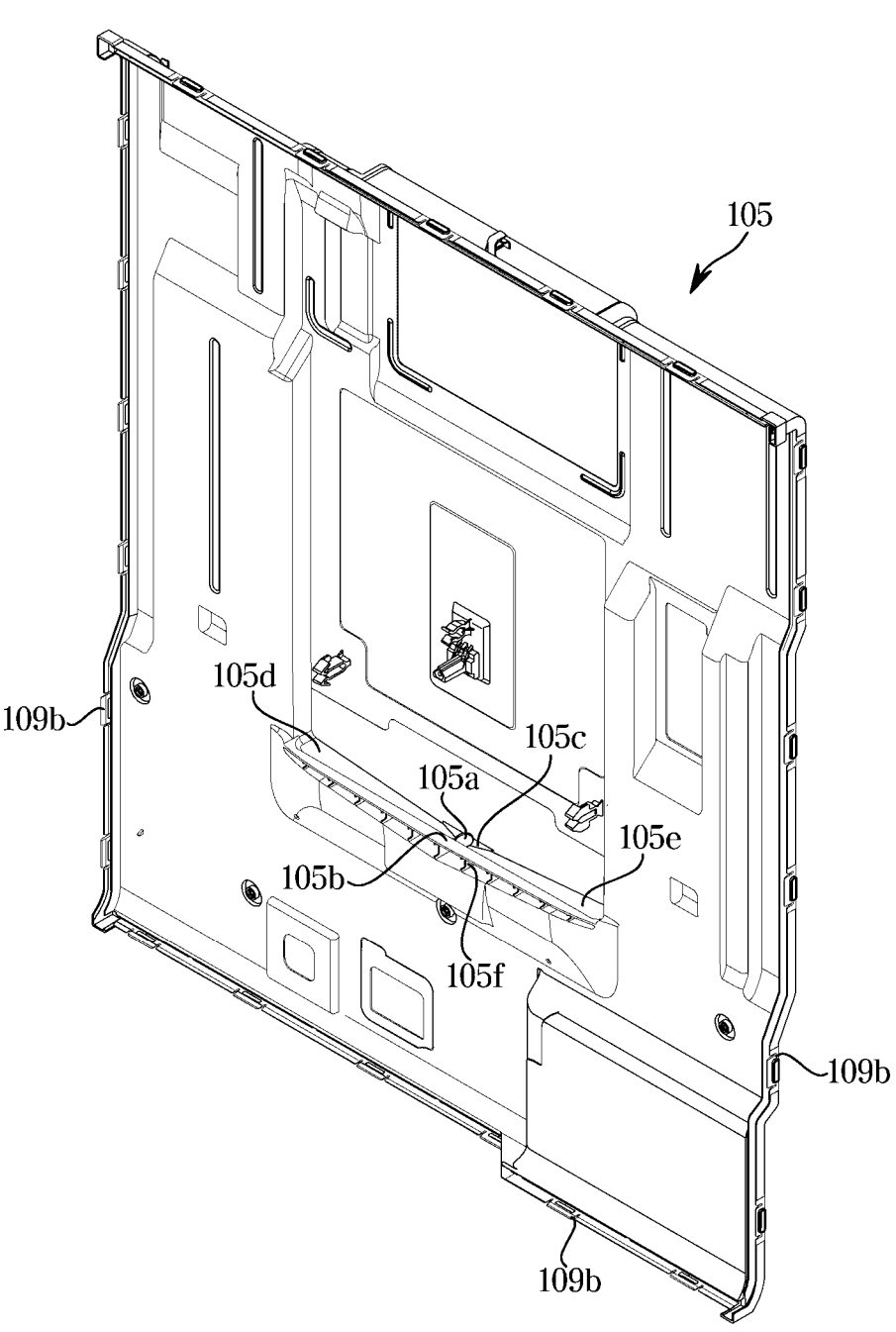
FIG. 6 is a view separately illustrating a rear plate of the first inner case in the refrigerator according to one embodiment of the present disclosure.
Figure 7:
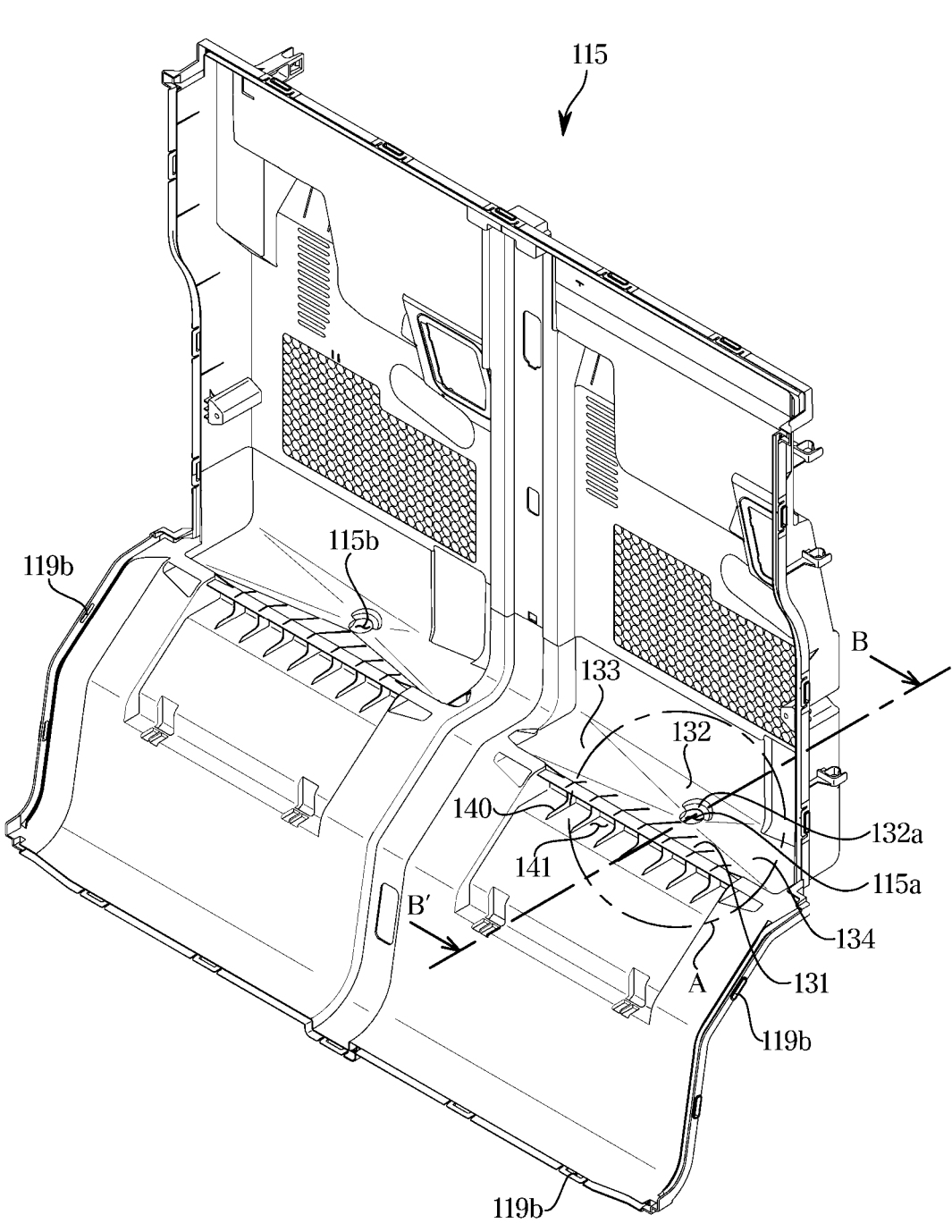
FIG. 7 is a view separately illustrating a rear plate of the second inner case in the refrigerator according to one embodiment of the present disclosure.

FIG. 6 is a view separately illustrating a rear plate of the first inner case in the refrigerator according to one embodiment of the present disclosure. FIG. 7 is a view separately illustrating a rear plate of the second inner case in the refrigerator according to one embodiment of the present disclosure.

Referring to FIGS. 6 and 7, in the refrigerator according to certain embodiments of the present disclosure, the first rear plate 105 of the first inner case 100a and the second rear plate 115 of the second inner case 100b may include the drain holes 105a and 115a.

When describing the first rear plate 105 of the first inner case 100a with reference to FIG. 6, the first rear plate 105 may include the drain hole 105a formed to penetrate the first rear plate 105 to discharge air inside the first inner case 100a to an outside of the first inner case 100a.

The drain hole 105a may be provided to discharge the condensed water or defrost water generated from the evaporator E disposed inside the first inner case 100a to the outside of the first inner case 100a. Referring to FIG. 2, the evaporator E may be disposed adjacent to the first rear plate 105 which is the rear side of the first inner case 100a. The condensed water or defrost water generated from the evaporator E may move downward by gravity, and the drain hole 105a may discharge the condensed water or defrost water to the outside of the first rear plate 105.

The first rear plate 105 may include a plurality of inclined surfaces 105b, 105c, 105d, and 105e inclined downward toward the drain hole 105a to allow water, which moves around the drain hole 105a, to flow to the drain hole 105a. The plurality of inclined surfaces 105b, 105c, 105d, and 105e may include a first inclined surface 105b disposed in front of the drain hole 105a, a second inclined surface 105c disposed behind the drain hole 105a, and a third inclined surface 105d and a fourth inclined surface 105e disposed on both sides of the drain hole 105a.

Below the first inclined surface 105b, an undercut prevention surface may be spaced apart from the first inclined surface 105b and provided to form a portion of an outer surface of the first rear plate 105.

A separation space may be formed between the first inclined surface 105b and the undercut prevention surface, and a plurality of connecting ribs 105f may be disposed in the separation space to connect the first inclined surface 105b and the undercut prevention surface.

When describing the second rear plate 115 of the second inner case 100b with reference to FIG. 7, the second rear plate 115 may include the drain hole 115a formed to penetrate the second rear plate 115 to discharge air inside the second inner case 100b to an outside of the second inner case 100b.

The drain hole 115a may be provided to discharge condensed water or defrost water generated from the evaporator E disposed inside the second inner case 100b to the outside of the second inner case 100b. Referring to FIG. 2, the evaporator E may be disposed adjacent to the second rear plate 115 which is the rear side of the second inner case 100b. The condensed water or defrost water generated from the evaporator E may move downward by gravity, and the drain hole 115a may discharge the condensed water or defrost water to the outside of the second rear plate 115.

According to certain embodiments of the present disclosure, the second inner case 100b may form the first storage compartment 23 and the second storage compartment 24 disposed left and right (refer to FIG. 1).

The evaporator E may be disposed inside the first storage compartment 23 and the second storage compartment 24, respectively, and accordingly, the second rear plate 115 of the second inner case 100b may include the pair of drain holes 115a and 115b. The pair of drain holes 115a and 115b formed in the second rear plate 115 of the second inner case 100b may have the same structure. Therefore, hereinafter only the drain hole 115a will be described.

The second rear plate 115 may include a plurality of inclined surfaces 131, 132, 133 and 134 inclined downward toward the drain hole 115a so as to allow water, which moves around the drain hole 115a, to flow toward the drain hole 115a.

The plurality of inclined surfaces 131, 132, 133, and 134 may include a first inclined surface 131 disposed in front of the drain hole 115a, a second inclined surface 132 disposed behind the drain hole 115a, and a third inclined surface 133 and a fourth inclined surface 134 disposed on both sides of the drain hole 115a. In the description, the first inclined surface 131 and the second inclined surface 132 may be referred to as a front inclined surface 131 and a rear inclined surface 132, respectively.

Below the first inclined surface 131, an undercut prevention surface 135 may be arranged to be spaced apart from the first inclined surface 131 and provided to form a portion of an outer surface of the second rear plate 115.

A separation space 141 may be formed between the first inclined surface 131 and the undercut prevention surface 135, and a plurality of connecting ribs 140 may be disposed in the separation space to connect the first inclined surface 131 and the undercut prevention surface 135.

According to the present disclosure, the drain hole 105a, the plurality of inclined surfaces 105b, 105c, 105d, and 105e, the undercut prevention surface (not shown) and the connecting rib 105g that are provided in the first rear plate 105 of the first inner case 100a may have substantially the same structure as the drain hole 115a, the plurality of inclined surfaces 131, 132, 133, and 134, the undercut prevention surface 135 and the connecting rib 140 that are provided in the second rear plate 115 of the second inner case 100b. Therefore, hereinafter the present disclosure will be described with the drain hole 115a and a configuration of a vicinity of the drain hole 115a provided in the second rear plate 115 of the second inner case 100b.

Figure 8:
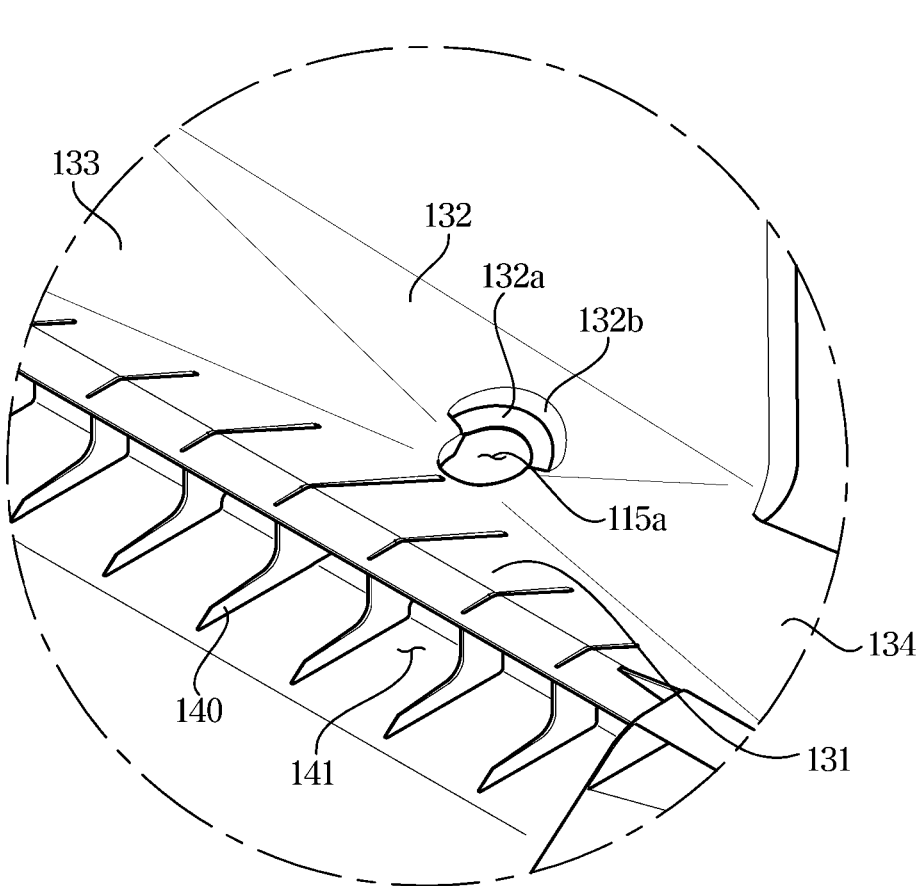
FIG. 8 is an enlarged view of a part A of FIG. 7.
Figure 9:
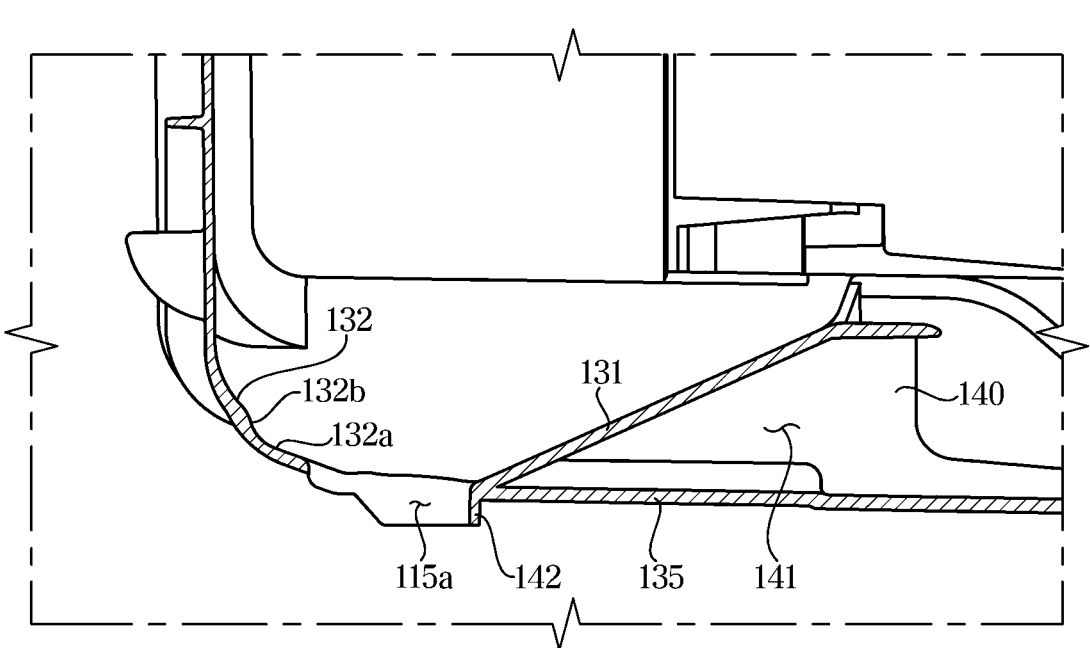
FIG. 9 is a cross-sectional view taken along a line B-B' in FIG. 7.
Figure 10:
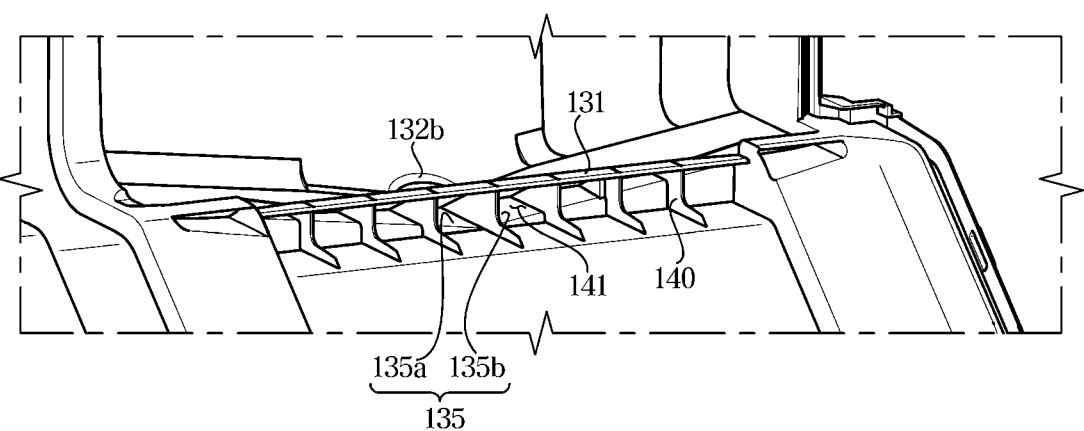
FIG. 10 is a view of the part A of FIG. 7 when viewed from another angle.

FIG. 8 is an enlarged view of a part A of FIG. 7. FIG. 9 is a cross-sectional view taken along a line B-B' in FIG. 7. FIG. 10 is a view of the part A of FIG. 7 when viewed from another angle.

Referring to FIGS. 8 to 10, the vicinity of the drain hole 115a may include the first to fourth inclined surfaces 131, 132, 133, and 134 inclined downward toward the drain hole 115a. The undercut prevention surface 135 may be provided below the first inclined surface 131 disposed in front of the drain hole 115a and inclined downward from the front to the rear.

According to the present disclosure, because the second rear plate 115 to be injection molded includes the undercut prevention surface 135, it is possible to minimize the generation of undercuts during the injection molding of the second rear plate 115. Additionally, material costs may be reduced by thin-film injection molding of the second rear plate 115. In addition, the second rear plate 115 may be manufactured at high-speed by the injection molding of the second rear plate 115 through the plurality of gates G (refer to FIG. 11). Therefore, according to the present disclosure, when the injection molding of the second rear plate 115, the generation of undercuts may be minimized and the second rear plate 115 may be injection molded at high speed and injection-molded into a thin film.

The undercut prevention surface 135 may be provided below the first inclined surface 131. The undercut prevention surface 135 may extend forward from one end of the first inclined surface 131. Particularly, the undercut prevention surface 135 may extend forward from a lower end of the first inclined surface 131. The undercut prevention surface 135 may be flat in the front and rear direction. Alternatively, the undercut prevention surface 135 may be inclined upward from the front to the rear. That is, the undercut prevention surface 135 may be flat from the front to the rear or inclined upward from the front to the rear. Through this structure, the generation of undercuts may be minimized when injection molding of the second rear plate 115.

According to certain embodiments of the present disclosure, the second rear plate 115 may be injection molded using a first mold (not shown) and a second mold (not shown) that are coupled and separated in the front and rear direction. Because the direction of coupling and separation of the first mold and the second mold is the front and rear direction, undercut may be generated in the process of forming the first inclined surface 131. This is because the first inclined surface 131 is inclined downward from the front to the rear. When the first mold moves forward and the second mold moves backward during the injection molding process, the backward movement of the second mold may be restricted due to the first inclined surface. Accordingly, the undercuts may be generated.

According to the present disclosure, because the second rear plate 115 includes the undercut prevention surface 135, it is possible to prevent the generation of undercuts caused by the first inclined surface 131. Below the first inclined surface 131, the undercut prevention surface 135 may be disposed to be spaced apart and may form a portion of the outer surface of the second rear plate 115. Additionally, undercut prevention surface 135 may be flat from the front to the rear (refer to FIG. 9)

When the undercut prevention surface 135 forming the outer surface of the second rear plate 115 is flat from the front to the rear, undercuts may not be generated in the first and second molds that are separated in the front and rear direction. Therefore, the generation of undercuts may be prevented.

Although not shown in the drawing, the undercut prevention surface may be inclined upward from the front to the rear. This is because, even with this structure, undercuts may not be generated in the first and second molds that are separated in the front and rear direction.

According to the present disclosure, for the high-speed injection molding of the second rear plate 115, the second rear plate 115 may be formed to have a thin thickness. That is, the second rear plate 115 may be injection-molded at high speed and injection-molded into a thin film.

For the high-speed and thin-film injection molding of the second rear plate 115, a thickness of the undercut prevention surface 135 may be substantially the same as a thickness of the first inclined surface 131. In addition, the undercut prevention surface 135 may extend forward from the lower end of the first inclined surface 131, and the separation space 141 may be formed between the undercut prevention surface 135 and the first inclined surface 131. By forming the separation space 141 between the undercut prevention surface 135 and the first inclined surface 131, the thickness of the undercut prevention surface 135 and the thickness of the first inclined surface 131 may be substantially the same.

The connecting rib 140 may be disposed in the separation space 141 between the undercut prevention surface 135 and the first inclined surface 131. In the separation space 141, the connecting rib 140 may connect the undercut prevention surface 135 and the first inclined surface 131. The connecting rib 140 may include the plurality of connecting ribs 140, and the plurality of connecting ribs 140 may be arranged to be spaced apart in the left and right direction in the separation space 141. The plurality of connecting ribs 140 may be provided to reinforce the strength of the first inclined surface 131 which is weak due to its thin thickness. Accordingly, the plurality of connecting ribs 140 may be referred to as reinforcing ribs 140.

The second rear plate 115 may include the second inclined surface 132 disposed behind the drain hole 115a and inclined upward from the front to the rear.

The second inclined surface 132 may include a depression 132a formed by recessing a region of the second inclined surface 132 adjacent to the drain hole 115a. The depression 132a may be provided behind the drain hole 115a and may be formed along a circumference of the drain hole 115a.

The depression 132a may include a recessed surface 132b forming a circumference of the depression 132a and having an inclination angle greater than an inclination angle of the second inclined surface 132 (refer to FIG. 9). The recessed surface 132b may form an edge of the depression 132a. By providing the recessed surface 132b and the depression 132a, it is possible to prevent water flowing along the rear surface of the second rear plate 115 from accumulating around the drain hole 115a. That is, water flowing downward along the rear surface of the second rear plate 115 may be guided to the depression 132a by the recessed surface 132b having a large inclination angle, and the water guided to the depression 132a may be discharged to the outside of the second rear plate 115 through the drain hole 115a. Accordingly, the depression 132a and the recessed surface 132b may prevent water from accumulating in the second rear plate 115.

The reason why the depression 132a and the recessed surface 132b are provided only on the second inclined surface 132 is because the second inclined surface 132 is the shortest of the plurality of inclined surfaces 131, 132, 133, and 134. Because the second inclined surface 132 is shorter than the first inclined surface 131, the third inclined surface 133, and the fourth inclined surface 134, the second inclined surface 132 may not sufficiently guide the water. Accordingly, in order to compensate for this, the depression 132a and the recessed surface 132b may be provided in the second inclined surface 132.

Referring to FIG. 9, as described above, the undercut prevention surface 135 may be disposed below the first inclined surface 131 and may extend forward from the lower end of the first inclined surface 131. Additionally, the undercut prevention surface 135 may be flat forward from the rear in which the drain hole 115a is disposed. Unlike what is shown in the drawing, the undercut prevention surface may be inclined downward from the rear to the front.

According to the present disclosure, the second rear plate 115 may further include a guide rib 142 formed along the circumference of the drain hole 115a and extending downward of the drain hole 115a. The guide rib 142 may be provided to guide water flowing into the drain hole 115a downward. A specific structure of the guide rib 142 will be described later.

Referring to FIG. 10, the undercut prevention surface 135 may include a first portion 135a and a second portion 135b.

The first portion 135a may be inclined downward from the left to the right, and the second portion 135b may be inclined upward from the left to the right. The first portion 135a and the second portion 135b may be connected to each other. The first portion 135a may be provided to have the same inclination angle as the third inclined surface 133, and the second portion 135b may be provided to have the same inclination angle as the fourth inclined surface 134.

As described above, the undercut prevention surface 135 may be flat in the front and rear direction. The undercut prevention surface 135 may be flat in the front and rear direction and inclined in the left and right direction.

Figure 11:
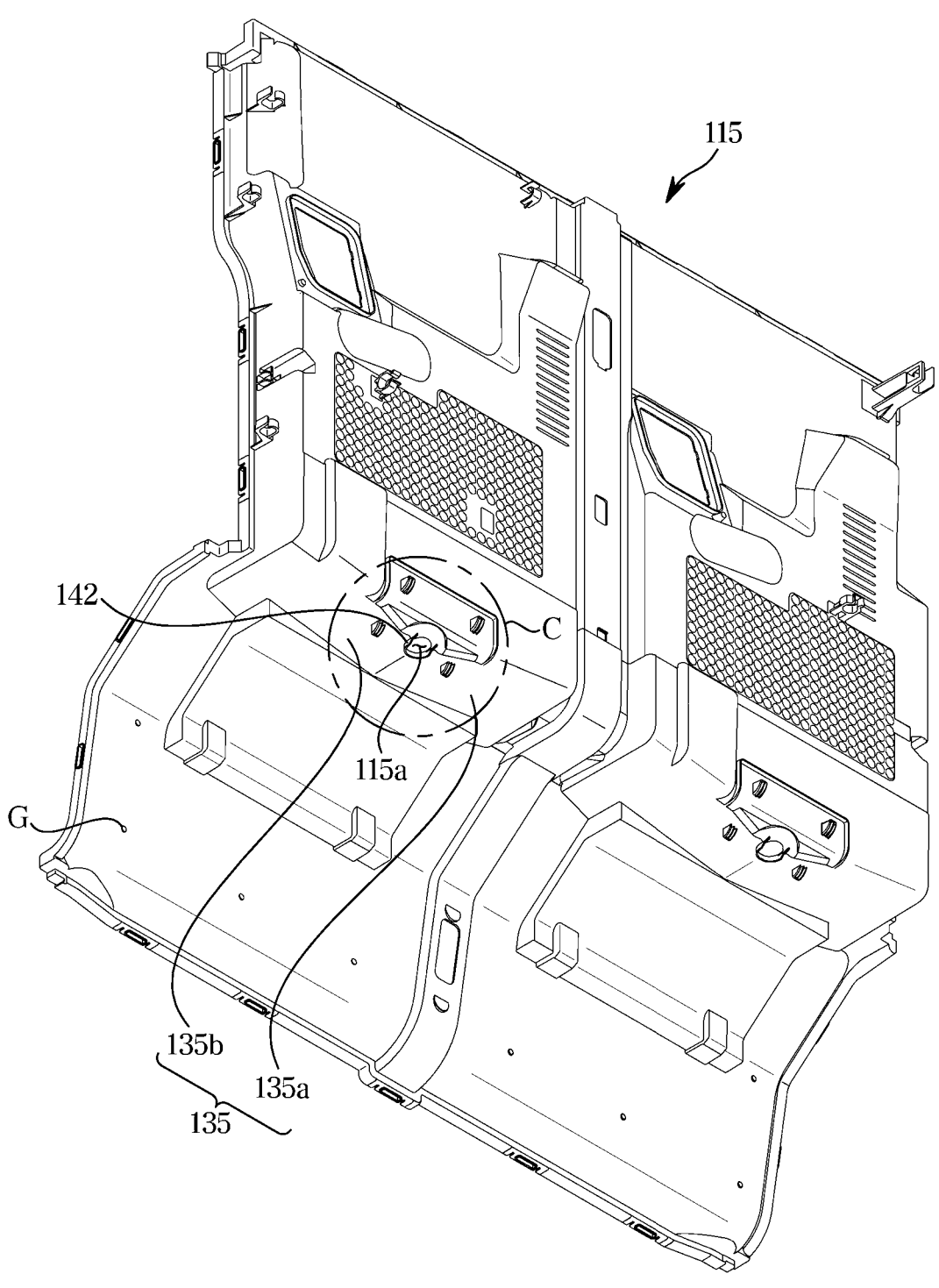
FIG. 11 is a view illustrating the rear plate of the second inner case shown in FIG. 7 when viewed from another angle.
Figure 12:
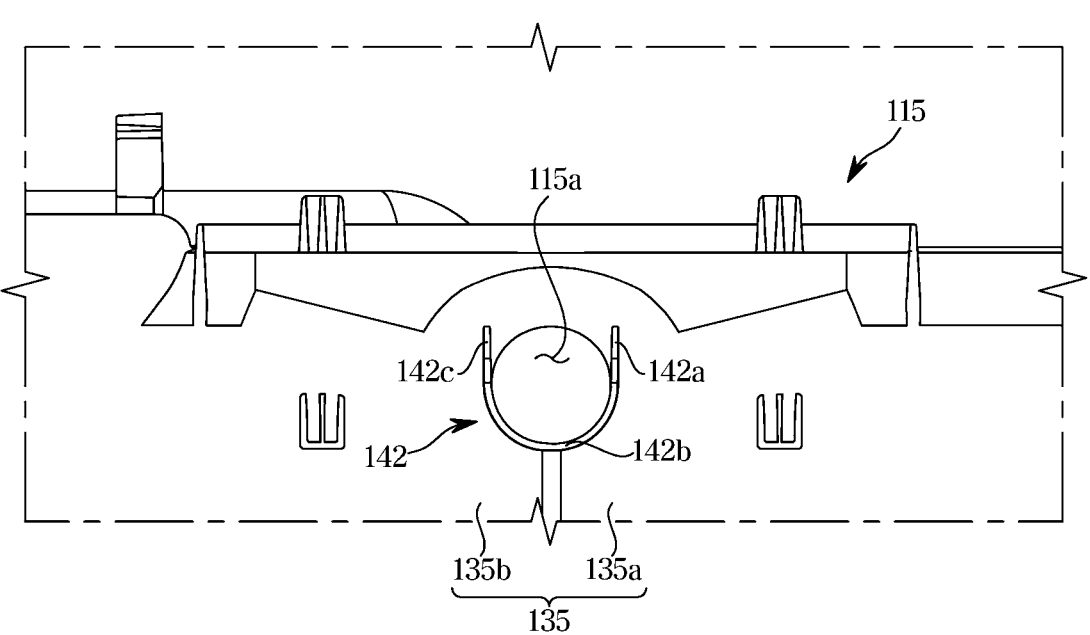
FIG. 12 is a view of a part C of FIG. 11 when viewed from another angle.

FIG. 11 is a view illustrating the rear plate of the second inner case shown in FIG. 7 when viewed from another angle. FIG. 12 is a view of a part C of FIG. 11 when viewed from another angle.

Hereinafter the guide rib 142 according to one embodiment of the present disclosure will be described in detail with reference to FIGS. 11 and 12.

According to the present disclosure, the second rear plate 115 may include the guide rib 142 that is injection molded integrally with the second rear plate 115. The guide rib 142 may be formed along the circumference of the drain hole 115a and may extend downward of the drain hole 115a. The guide rib 142 may guide water flowing into the drain hole 115a downward.

Referring to FIGS. 11 and 12, the guide rib 142 may extend from one side of the drain hole 115a to the other side through the front side. Particularly, the guide rib 142 may include a first guide portion 142a disposed on one side of the drain hole 115a, a second guide portion 142c disposed on the other side of the drain hole 115a, and a connecting portion 142b connecting the first guide portion 142a and the second guide portion 142c. The first guide portion 142a and the second guide portion 142b may be disposed on the left or right side of the drain hole 115a, respectively, and the connecting portion 142b may be disposed in front of the drain hole 115a. According to the above-described structure, the guide rib 142 may be provided in an approximately U-shape. The guide rib 142 may be provided so as not to form a closed loop. The guide rib 142 may be provided to extend from one side of the drain hole 115a to the other side through the front side and may not be provided at the rear of the drain hole 115a.

The reason why the guide rib 142 is provided in the above-described U-shape is because, when the second rear plate 115 is injection molded, the first mold and the second mold are separated in the front and direction. Because the guide rib 142 is not provided at the rear of the drain hole 115a, the generation of undercuts due to the guide rib 142 may be prevented when the mold is separated to the rear of the second rear plate 115.

While the present disclosure has been particularly described with reference to exemplary embodiments, it should be understood by those of skilled in the art that various changes in form and details may be made without departing from the spirit and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
an inner case forming a storage compartment, and comprising a plurality of plates formed by injection molding;
an outer case coupled to an outside of the inner case to form an external appearance; and
an insulation disposed between the inner case and the outer case,
wherein a rear plate corresponding to one of the plurality of plates comprises:
a drain hole formed through the rear plate to discharge water inside the inner case to an outside of the inner case;
an inclined surface incline downward toward the drain hole to allow water inside the inner case to flow to the drain hole;

an undercut prevention surface disposed below the inclined surface and spaced apart from the inclined surface, and forming a portion of an outer surface of the rear plate; and a connecting rib provided to connect the inclined surface and the undercut prevention surface in a separation space formed between the inclined surface and the undercut prevention surface.

2. The refrigerator of claim 1, wherein the undercut prevention surface is flat from a front side to a rear side or inclined upward from the front side to the rear side.

3. The refrigerator of claim 1, wherein the undercut prevention surface is provided with substantially the same thickness as the inclined surface.

4. The refrigerator of claim 1, wherein the undercut prevention surface extends from one end of the inclined surface.

5. The refrigerator of claim 1, wherein the undercut prevention surface comprises:

a first portion inclined downward in a left and right direction; and a second portion connected to the first portion and inclined upward in the left and right direction.

6. The refrigerator of claim 1, wherein:

the inclined surface comprises:

a first inclined surface inclined downward from a front side to a rear side and disposed in front of the drain hole; and a second inclined surface inclined upward from the front side to the rear side and disposed behind the drain hole, and the undercut prevention surface is disposed below the first inclined surface.

7. The refrigerator of claim 6, wherein the second inclined surface comprises a depression formed by recessing a region of the second inclined surface adjacent to the drain hole.

8. The refrigerator of claim 7, wherein the depression comprises a recessed surface having an inclination angle greater than an inclination angle of the second inclined surface.

9. The refrigerator of claim 1, wherein:

the connecting rib comprises a plurality of connecting ribs, and the plurality of connecting ribs is arranged to be spaced apart from each other in a left and right direction within the separation space.

10. The refrigerator of claim 1, wherein the rear plate further comprises a guide rib formed along a circumference of the drain hole and extending downward from the circumference of the drain hole.

11. The refrigerator of claim 10, wherein the guide rib extends from one side of the drain hole to another side of the drain hole through a front side of the drain hole.

12. The refrigerator of claim 1, wherein the plurality of plates comprises an upper plate, a lower plate, a left plate, a right plate, and the rear plate that form an upper surface, a lower surface, a left surface, a right surface, and a rear surface of the storage compartment, respectively.

13. A refrigerator comprising:

an inner case forming a refrigerating compartment, and including a plurality of plates formed by injection molding;

an outer case disposed outside the inner case to form an external appearance; and an insulation disposed between the inner case and the outer case, wherein a rear plate corresponding to one of the plurality of plates includes:

a drain hole formed through the rear plate to discharge water of the rear plate to an outside of the rear plate, an inclined surface provided to incline downward toward the drain hole to allow water inside the rear plate to flow to the drain hole and including a front inclined surface disposed in front of the drain hole, a rear inclined surface disposed behind the drain hole, an undercut prevention surface provided to extend from one end of the front inclined surface and spaced apart from the front inclined surface and forming a portion of an outer surface of the rear plate, and a connecting rib provided to connect the front inclined surface and the undercut prevention surface in a separation space formed between the front inclined surface and the undercut prevention surface.

14. The refrigerator of claim 13, wherein the undercut prevention surface is provided as flat from a rear end of the front inclined surface to a front side or provided to incline downward from the rear end of the front inclined surface to the front side.

15. The refrigerator of claim 13, wherein the undercut prevention surface includes:

a first portion provided to incline downward in a left and right direction, and a second portion connected to the first portion and provided to incline upward in the left and right direction.

16. The refrigerator of claim 13, wherein the rear inclined surface includes a depression formed by recessing a region of the rear inclined surface adjacent to the drain hole.

17. The refrigerator of claim 13, wherein the rear plate may further include a guide rib formed along a circumference of the drain hole and extending downward from the circumference of the drain hole.

* * * * *